US009669873B2

(12) United States Patent
Buschjohann et al.

(10) Patent No.: US 9,669,873 B2
(45) Date of Patent: Jun. 6, 2017

(54) MODULAR AXLE CONCEPT FOR A MOTOR VEHICLE WITH ELECTRIC DRIVE

(71) Applicant: KSM Castings Group GmbH, Hildesheim (DE)

(72) Inventors: Thomas Buschjohann, Nordstemmen (DE); Andreas Kiesel, Thalheim (DE); Gregor Bechtle, Schulzendorf (DE)

(73) Assignee: KSM Castings Group GmbH, Hildesheim (DE)

( * ) Notice: Subject to any disclaimer, the term of this patent is extended or adjusted under 35 U.S.C. 154(b) by 0 days.

(21) Appl. No.: 14/399,585

(22) PCT Filed: Apr. 11, 2013

(86) PCT No.: PCT/DE2013/100136
§ 371 (c)(1),
(2) Date: Nov. 7, 2014

(87) PCT Pub. No.: WO2013/167114
PCT Pub. Date: Nov. 14, 2013

(65) Prior Publication Data
US 2015/0114735 A1 Apr. 30, 2015

(30) Foreign Application Priority Data
May 8, 2012 (DE) .......... 10 2012 008 937

(51) Int. Cl.
*B60K 1/00* (2006.01)
*B62D 21/02* (2006.01)
(Continued)

(52) U.S. Cl.
CPC ............. *B62D 21/02* (2013.01); *B60G 7/001* (2013.01); *B60K 1/04* (2013.01); *B62D 21/11* (2013.01); *B62D 29/008* (2013.01); *B62D 29/04* (2013.01)

(58) Field of Classification Search
CPC .................. B62D 21/02; B62D 21/11
See application file for complete search history.

(56) References Cited

U.S. PATENT DOCUMENTS 5,915,727 A * 6/1999 Bonnville ................ B60G 7/02
280/124.1
6,105,984 A * 8/2000 Schmitz .................. B60G 3/20
180/256
(Continued)

FOREIGN PATENT DOCUMENTS

GB 2 365 829 A 2/2002

OTHER PUBLICATIONS

International Search Report of PCT/DE2013/100136, mailed Jul. 23, 2013.

*Primary Examiner* — J. Allen Shriver, II
*Assistant Examiner* — Travis Coolman
(74) *Attorney, Agent, or Firm* — Collard & Roe, P.C.

(57) ABSTRACT

A modular axle concept for a motor vehicle with electric drive includes a structure that supports the bodywork of the motor vehicle. The structure has an integration point or preferably a connection point, in each instance, for attachment of a coupling module, in each instance, for each wheel of the front axle and/or rear axle that can be driven electrically. The module can be connected with the electrically drivable wheel, particularly with its wheel mount.

34 Claims, 3 Drawing Sheets

Figure 1:
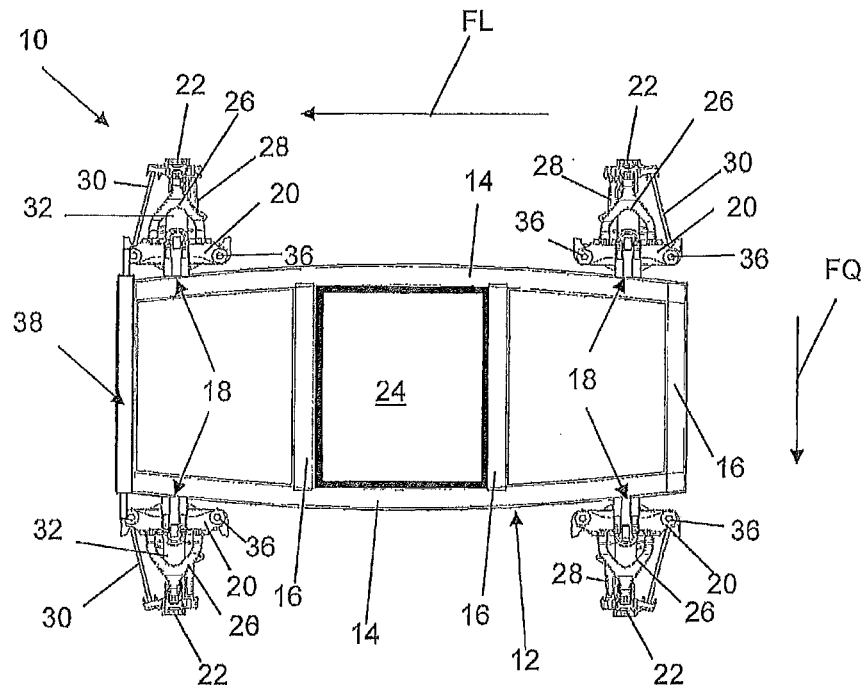

(51) Int. Cl.
  *B60K 1/04*   (2006.01)
  *B62D 21/11*  (2006.01)
  *B60G 7/00*   (2006.01)
  *B62D 29/00*  (2006.01)
  *B62D 29/04*  (2006.01)

(56) References Cited

U.S. PATENT DOCUMENTS

| | | | | |
|---|---|---|---|---|
| 6,260,645 B1* | 7/2001 | Pawlowski | ............... | B60G 3/14 180/65.22 |
| 6,516,914 B1* | 2/2003 | Andersen | ................ | B60G 3/20 180/312 |
| 6,561,718 B1* | 5/2003 | Archer | ..................... | B60G 7/00 267/292 |
| 6,764,085 B1* | 7/2004 | Anderson | ................ | B60G 7/00 280/124.134 |
| 6,976,688 B2* | 12/2005 | Archer | .................... | B60G 7/00 248/689 |
| 7,118,119 B2* | 10/2006 | Amanuma | ............... | B60G 3/20 180/65.51 |
| 7,722,059 B1* | 5/2010 | Marino | ..................... | A63H 17/262 248/297.21 |
| 8,083,243 B2* | 12/2011 | Hamada | .................. | B60G 7/02 180/65.51 |
| 8,276,697 B2* | 10/2012 | Takasaki | ................... | B60K 1/04 180/68.5 |
| 8,640,806 B2* | 2/2014 | Worup | ..................... | B60G 3/28 180/209 |
| 2003/0132584 A1* | 7/2003 | Borroni-Bird | ........... | B60G 3/18 280/5.5 |
| 2004/0099455 A1* | 5/2004 | Nagaya | .................... | B60G 3/20 180/65.51 |
| 2007/0199748 A1* | 8/2007 | Ross | ........................ | B60G 3/20 180/65.51 |
| 2009/0008918 A1* | 1/2009 | Hall | ........................ | B60K 6/12 280/781 |
| 2009/0236162 A1* | 9/2009 | Takasaki | ................... | B60K 1/04 180/68.5 |
| 2010/0006355 A1 | 1/2010 | Smith | | |
| 2011/0127094 A1 | 6/2011 | Hamada et al. | | |
| 2012/0111654 A1* | 5/2012 | Origuchi | .................. | B60K 1/04 180/68.5 |
| 2012/0169089 A1* | 7/2012 | Rawlinson | ......... | B62D 25/2027 296/193.08 |
| 2012/0181806 A1* | 7/2012 | Worup | ..................... | B60G 3/28 296/1.01 |
| 2013/0020140 A1* | 1/2013 | Auer | ........................ | B60K 1/04 180/68.5 |
| 2013/0206496 A1* | 8/2013 | Hashimoto | ............ | B62D 21/12 180/291 |

* cited by examiner

MODULAR AXLE CONCEPT FOR A MOTOR VEHICLE WITH ELECTRIC DRIVE

CROSS REFERENCE TO RELATED APPLICATIONS

This application is the National Stage of PCT/DE2013/100136 filed on Apr. 11, 2013, which claims priority under 35 U.S.C. §119 of German Application No. 10 2012 008 937.6 filed on May 8, 2012, the disclosure of which is incorporated by reference. The international application under POT article 21(2) was not published in English.

The invention relates to a modular axle concept for a motor vehicle with electric drive.

The invention is based on the task of making available a modular axle concept for a motor vehicle with electric drive, which can be produced in cost-advantageous, simple, and assembly-friendly manner. Furthermore, a modular axle concept with the lowest possible weight, at simultaneously great ability to withstand stress, is supposed to be made available.

According to the invention, this task is accomplished with a modular axle concept for a motor vehicle with electric drive, comprising a structure that supports the bodywork of the motor vehicle, which structure has an integration point or preferably a connection point, in each instance, for attachment of a coupling module, in each instance, for each wheel of the front axle and/or rear axle that can be driven electrically, which module can be connected with the electrically drivable wheel, particularly with its wheel mount.

It can be advantageous if the supporting structure is a chassis.

It can be practical if the supporting structure is a part of a self-supporting car body provided in the bottom region of the motor vehicle.

It can be advantageous if the supporting structure is a part of a skeleton car body provided in the bottom region of the motor vehicle, particularly of a skeleton composed of profiles, particularly hollow profiles, provided in the bottom region of the motor vehicle.

It can be advantageous if the chassis is formed from a frame.

It can be practical if the frame is configured as a ladder frame or in the manner of a ladder frame, composed of at least two longitudinal supports and at least two transverse supports.

It can be advantageous if one or more than one support that forms or helps to form the frame, preferably a longitudinal support, has a non-straight course.

It can be advantageous if one or more than one holder for at least one battery is provided, which is connected with the supporting structure.

It can be practical if the battery holder comprises a battery box.

It can be advantageous if the battery holder is connected with the supporting structure in such a manner that it has a non-supporting function within the supporting structure or preferably a supporting function within the supporting structure.

It can be advantageous if one or more than one battery holder is connected with the supporting structure and positioned in it in such a manner that the rigidity of the integration points or preferably the connection points for attachment of a coupling module, in each instance, and/or the rigidity between the integration points or preferably the connection points that essentially form an axle, for attachment of a coupling module, in each instance, is increased.

It can be advantageous if one or more than one battery holder is disposed between two frame parts of the supporting structure that extend in the longitudinal vehicle direction, in such a manner that the rigidity, particularly the transverse rigidity of the integration points or preferably the connection points for attachment of a coupling module, in each instance, and/or the rigidity, particularly the transverse rigidity between the integration points or preferably the connection points that essentially form an axle, for attachment of a coupling module, in each instance, is increased.

It can be advantageous if the integration point or preferably the connection point for attachment of a coupling module, in each instance, is configured universally, in such a manner that each coupling module can be connected with this integration point or connection point, with a correspondingly predetermined universal region, whereby the coupling module is individually configured in accordance with the requirements profile, for the remainder.

It can be practical if the coupling module can be connected with the supporting structure as a pre-assembled unit, particularly with the wheel suspension and the corresponding wheel mount, whereby the wheel mount can be connected with an electrically drivable wheel in advance or later. In other words: The wheel can already be part of the pre-assembled unit or can also be connected to this unit only later, in other words after the supporting structure was connected with the coupling module configured as a prefinished unit.

It can be practical if the integration point is an empty space within the supporting structure, in such a manner that at least one accordingly predetermined region of the coupling module can be inserted into it and can be connected with the adjacent regions of the supporting structure.

It can be advantageous if the connection point is configured as an accommodation, in such a manner that at least one correspondingly predetermined region of the coupling module, for example a stump or connecting piece, can be inserted into it and connected with it.

It can be advantageous if the connection point is configured in the manner of a stump or connecting piece, in such a manner that a correspondingly predetermined region of the coupling module can be applied to it and connected with it.

It can be advantageous if the supporting structure is configured in one piece or multiple pieces with the coupling module, in each instance.

It can be advantageous if the supporting structure, the battery holder and/or the coupling module are produced, at least in part, from a light material.

For specific application cases, a light metal can be advantageous as a light material. For other application cases, a plastic can be advantageous as a light material. For yet again other cases, a composite of light metal and plastic can be advantageous.

The light metal can consist of aluminum, magnesium, zinc or of alloys with one or more of these metals. For specific purposes of use, one or more parts of the supporting structure, of the battery holder and/or of the coupling element can advantageously also consist of steel or iron, particularly of cast steel or cast iron.

It can be advantageous if the plastic is a glass-fiber-reinforced plastic GFRP, particularly a glass-fiber-reinforced polyamide. However, a plastic composed of polypropylene, particularly glass-fiber-reinforced polypropylene, can also be advantageously used. For certain purposes of use, it can be advantageous if a plastic is used that is known under the name Ultramid® A3WG10 CR. A carbon-fiber-reinforced plastic CFRP can also be advantageous.

It can be practical if the coupling module is produced as a one-piece cast component.

It can be advantageous if the coupling module is produced by means of squeeze casting, counter-pressure ingot mold casting (CPC), die-casting, particularly by means of thixo-casting, rheocasting or low-pressure sand casting, or by means of gravity ingot mold casting.

It can be advantageous if the supporting structure, the coupling module and/or the battery holder are configured, at least in part, as an injection-molded profile, extruded profile, continuously cast profile or cast profile.

Advantageously, the coupling module can be configured with at least one connection point for at least one transverse control arm.

It can be advantageous if the transverse control arm is an upper transverse control arm.

It can be advantageous if the transverse control arm is a lower transverse control arm.

It can be advantageous if the coupling module is configured with at least one connection point for a longitudinal control arm.

It can be advantageous if the coupling module is configured with at least one connection point for a tie rod.

It can be advantageous if the coupling module is configured with at least one connection point for a spring unit or shock absorber unit.

It can be practical if the coupling module is configured with at least one connection point for connecting the coupling module to the car body.

It can be advantageous if the coupling module has an accommodation sleeve for connecting to the connection point of the supporting structure.

It can be advantageous if the accommodation sleeve for the connection point of the supporting structure is a projection adapted to the outer contour of the connection point.

The supporting structure and the coupling module, in each instance, can advantageously be connected, at least in part, by means of gluing, preferably by means of welding, particularly by means of resistance spot welding, by means of crimping of predetermined regions of the coupling module and/or of the supporting structure, by means of clinching, by means of riveting and/or by means of screw connections.

It can be advantageous if the accommodation sleeve of the coupling module and a projection, stump, connecting piece or the like, which forms the connection point of the supporting structure, are oriented predominantly horizontally relative to the road.

It can be advantageous if at least a part of the coupling module is preferably connected with the supporting structure in non-releasable manner.

A particular advantage can consist in that the coupling module has one or more reinforcement elements, particularly reinforcement ribs, belts, beads, bulges, crosspieces and/or perforations, but preferably multiple reinforcement ribs.

It can be advantageous if the electric drive is an electric motor close to the wheel or a wheel hub motor.

Furthermore, it can be advantageous if the coupling module has one or more bores, channels or recesses, which form brake lines and/or cooling lines, or through which brake lines and/or cooling lines are passed.

Figure 2:
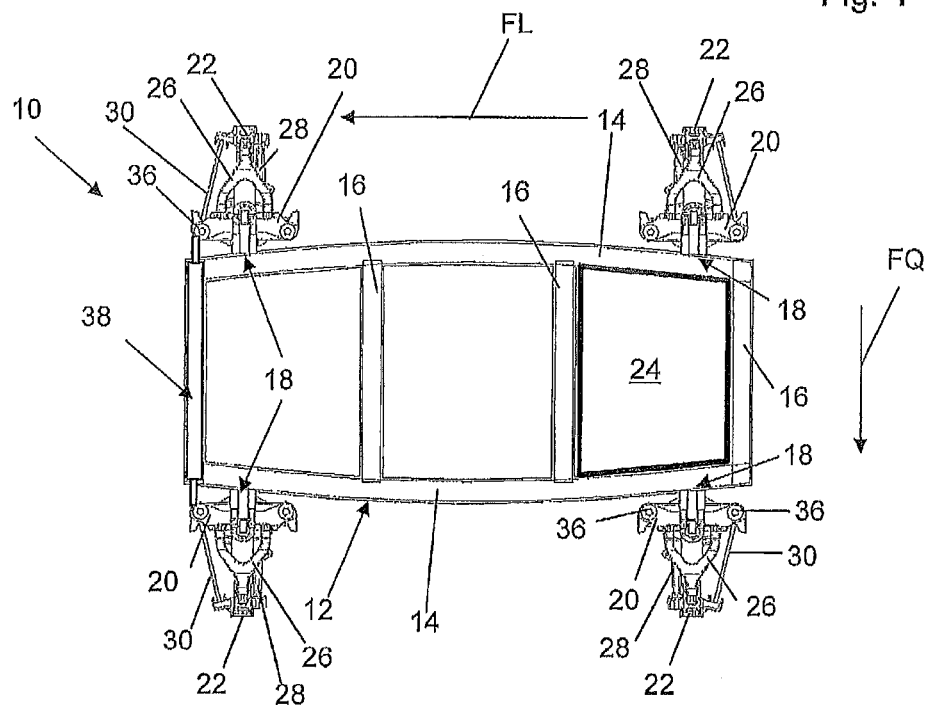
Figure 3:
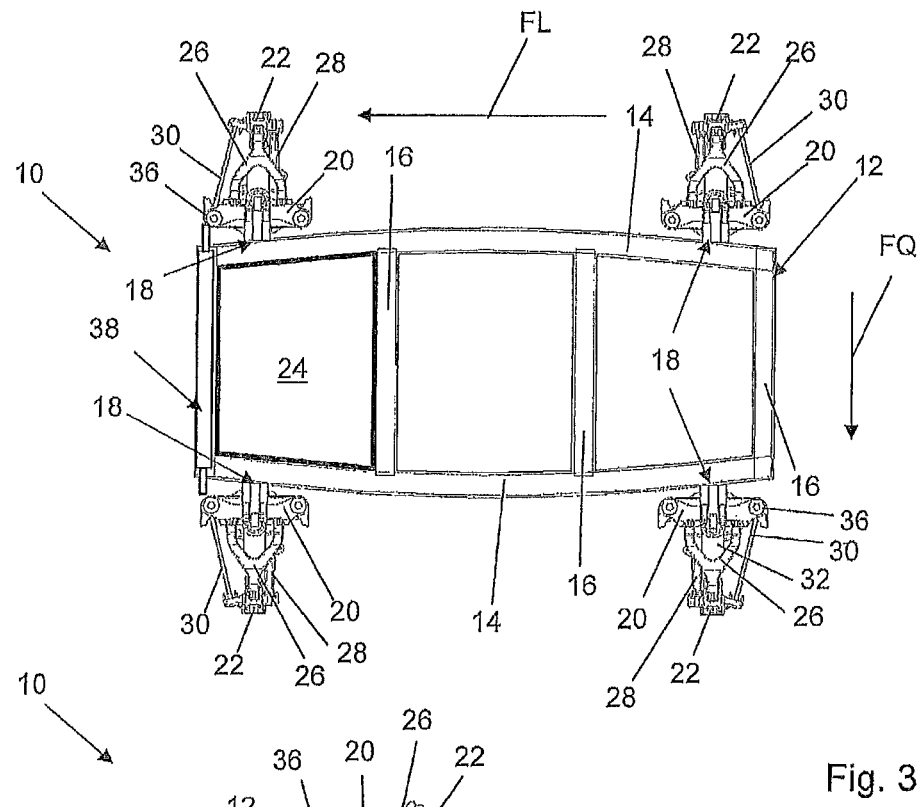
Figure 4:
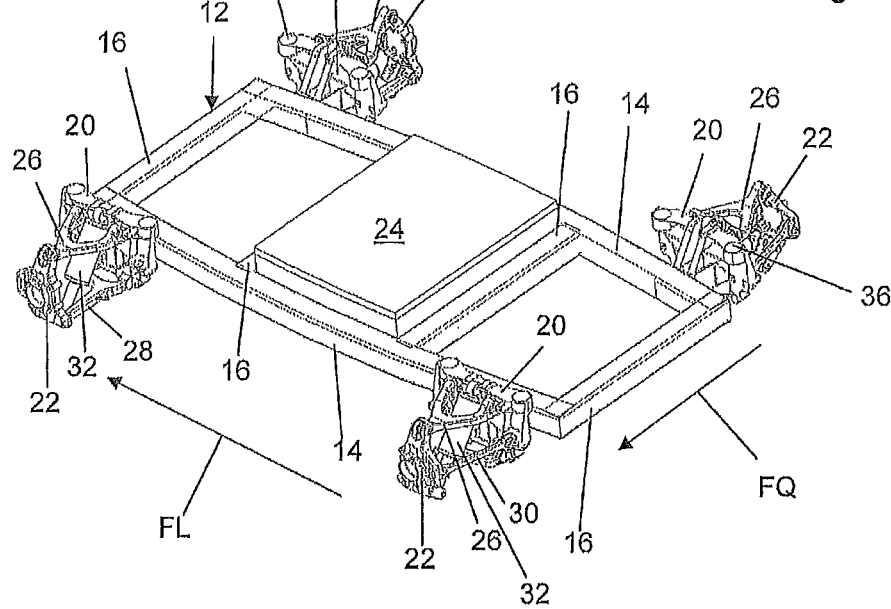
Figure 5:
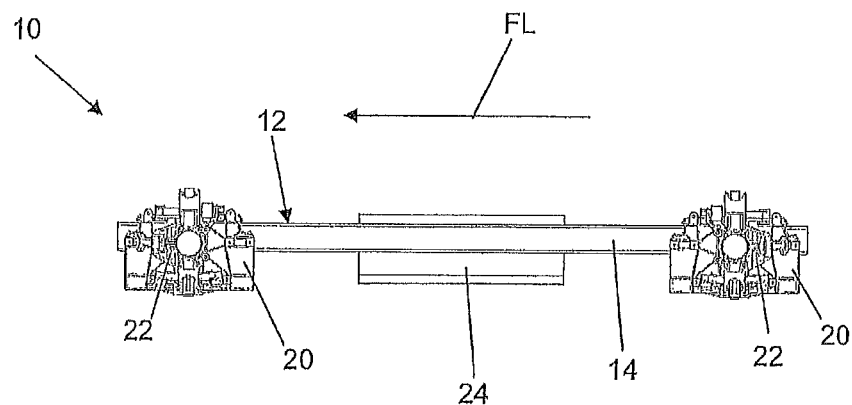
Figure 6:
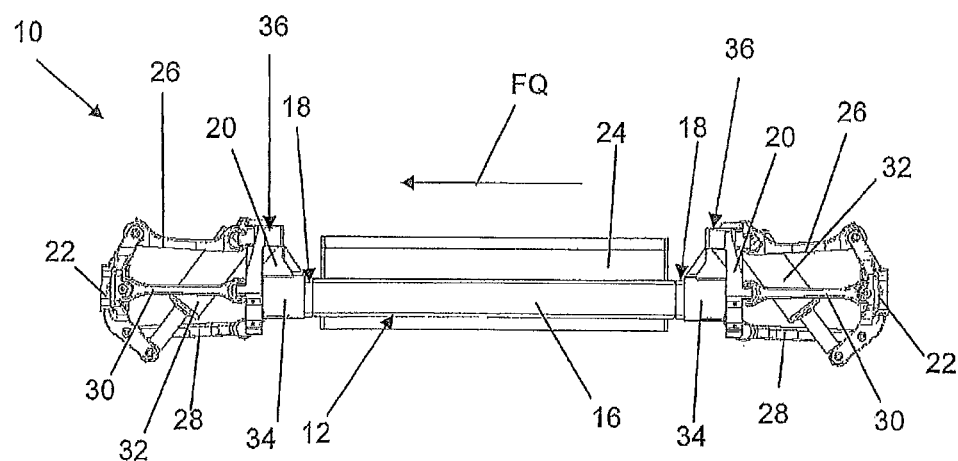

Further details and advantageous embodiments of the invention are evident from the following description in combination with the drawing. This shows:

FIG. 1 a schematic top view of a modular axle concept with a chassis in the form of a frame and four coupling elements attached to it, which are connected with a wheel mount for accommodation of a wheel, as a prefinished unit, in each instance, by way of a wheel suspension, and with a battery box positioned centrally within the frame and connected with it, FIG. 2 a schematic top view of a modular axle concept with a chassis in the form of a frame and four coupling elements attached to it, which are connected with a wheel mount for accommodation of a wheel, as a prefinished unit, in each instance, by way of a wheel suspension, and with a battery box positioned in the rear region—viewed in the direction of travel—of the frame, within the latter and connected with it, FIG. 3 a schematic top view of a modular axle concept with a chassis in the form of a frame and four coupling elements attached to it, which are connected with a wheel mount for accommodation of a wheel, as a prefinished unit, in each instance, by way of a wheel suspension, and with a battery box positioned in the front region—viewed in the direction of travel—of the frame, within the latter and connected with it, FIG. 4 a perspective view of the module axle concept according to FIG. 1, FIG. 5 a top view of a longitudinal side of the modular axle concept according to FIG. 1, and FIG. 6 a top view of a rear side of the modular axle concept according to FIG. 1.

In order to avoid repetition, the same reference symbols are used in the figures if they refer to the same components.

The longitudinal vehicle direction of the motor vehicle is represented by an arrow FL, and the transverse vehicle direction by an arrow FQ.

The modular axle concept 10, according to the invention, for a motor vehicle provided with at least one electric drive, shown in the figures, comprises a structure, in the form of a chassis that supports the bodywork of the motor vehicle, not shown here, configured as a ladder frame 12 with two curved longitudinal supports 14 and four transverse supports 16. According to the invention, the ladder frame 12 has a connection point 18 for attachment of a coupling module 20, in each instance, for each electrically drivable wheel of the front axle and of the rear axle, in each instance, whereby the coupling module 20 is advantageously connected, as a prefinished or pre-assembled unit, with a wheel mount 22 mounted by way of a suspension, which mount can be connected with an electrically drivable wheel, not shown here.

The suspension or connection between wheel mount 22 and coupling module 20 comprises an upper transverse control arm 26, a lower transverse control arm 28, a tie rod 30, and a spring unit or shock absorber unit 32, whereby the coupling element 20 has corresponding connection points for these.

Furthermore, the modular axle concept 10, according to the invention, comprises a holder for at least one battery required for the drive, in the present case in the form of a battery box 24, which is connected with the supporting structure and advantageously has a supporting function itself.

In FIGS. 1 to 3, the battery box 24 is positioned differently, in each instance. In all the variants, the battery box 24 increases the rigidity of the ladder frame 12, whereby the battery box 24 shown in FIG. 2, in particular, makes a contribution to reinforcement of the rear axle or of the rear connection structures 18 for the connection to the corresponding coupling module 20, in each instance, and the battery box 24 shown in FIG. 3 contributes to reinforcement of the front axle or of the front connection structures 18 for the connection to the corresponding coupling module 20.

In the figures, it can easily be seen that the coupling module 20 can be connected, in assembly-friendly manner, with the ladder frame 12, as a pre-assembled unit with suspension and wheel mount 22, whereby the wheel mount 22 can be connected with the electrically drivable wheel, not shown here. The advantage of such a modular axle concept 10 can also be recognized well: The most varied combination possibilities of different supporting structures 12 and different coupling modules 20 are possible, in accordance with the requirements, by way of a universal connection point 18 and a corresponding universal counterpart on the coupling module 20.

In this connection, the universal counterpart can advantageously be an accommodation sleeve 34 for connecting to the connection point 18 of the ladder frame 12, provided on the coupling module 20. The accommodation sleeve 34 for the connection point 18 of the ladder frame 12 is advantageously a projection or attachment adapted to the outer contour of the connection point. The connection pint 18 is then advantageously configured in the manner of a stump, for example in the manner of a bar stump.

It is advantageous if the ladder frame 12, particularly the connection point 18, is produced from aluminum or from an aluminum alloy, which is then welded to the coupling module 20 as a prefinished unit. The coupling module 20 is advantageously structured as a one-piece cast component.

Of course, other joining methods can also be used for connecting ladder frame 12 and coupling module 20. The production of a releasable connection between ladder frame 12 and coupling module 20, for example by means of a screw connection, can also be advantageous.

The coupling module 20 can also—as shown in the present case—have connection points 36 for connecting the coupling module 20 to the car body, not shown here. Furthermore, the coupling module 20 can have accommodations for attachment of a steering mechanism 38 or of a steering gear mechanism, only indicated schematically here.

The invention is not restricted to the exemplary embodiments, but rather is variable, in multiple ways, within the scope of the disclosure. All new individual characteristics and combination characteristics disclosed in the specification and/or the drawing can be advantageous.

The invention claimed is:

1. Modular axle concept for a motor vehicle having bodywork and at least one electric drive, comprising a supporting structure that supports the bodywork of the motor vehicle, which supporting structure has a universally formed integration point or a universally formed connection point, in each instance, for attachment of a coupling module, in each instance, for each electrically drivable wheel of a front axle and/or a rear axle that can be driven electrically, which module can be connected with the electrically drivable wheel, whereby each coupling module is cast in one piece from a light metal and displays hereby a universal area which is connectable with the universally formed integration point or with the universally formed connection point, wherein the coupling module is individually configured in accordance with a requirements profile, for a remainder region, and wherein the coupling module has an accommodation sleeve for connecting to the connection point of the supporting structure.

2. Modular axle concept, according to claim 1, wherein one or more than one battery holder for at least one battery is provided, which is connected with the supporting structure.

3. Modular axle concept, according to claim 2, wherein the supporting structure and/or the battery holder are produced, at least in part, from a light material.

4. Modular axle concept, according to claim 3, wherein the light material is a light metal, a plastic or a composite of light metal and plastic.

5. Modular axle concept, according to claim 4, wherein the plastic is a glass-fiber-reinforced plastic GFRP.

6. Modular axle concept, according to claim 5, wherein the plastic is a carbon-fiber-reinforced plastic CFRP.

7. Modular axle concept, according to claim 4, wherein the light metal consists of aluminum, magnesium, zinc or of alloys with one or more of these metals.

8. Modular axle concept, according to claim 2, wherein the supporting structure, the coupling module and/or the battery holder are configured, at least in part, as an injection-molded profile, extruded profile, continuously cast profile or cast profile.

9. Modular axle concept, according to claim 2, wherein the battery holder comprises a battery box.

10. Modular axle concept, according to claim 2, wherein the battery holder is connected with the supporting structure in such a manner that the battery holder has a non-supporting function within the supporting structure or a supporting function within the supporting structure.

11. Modular axle concept, according to claim 1, wherein the supporting structure is a chassis.

12. Modular axle concept, according to claim 11, wherein the chassis is formed from a frame.

13. Modular axle concept, according to claim 12, wherein the frame is configured as a ladder frame or in the manner of a ladder frame, composed of at least two longitudinal supports and at least two transverse supports.

14. Modular axle concept, according to claim 12, wherein one or more than one support that forms or helps to form the frame has a non-straight course.

15. Modular axle concept, according to claim 1, wherein the coupling module is configured with at least one connection point for at least one transverse control arm.

16. Modular axle concept, according to claim 15, wherein the at least one transverse control arm is an upper transverse control arm.

17. Modular axle concept, according to claim 15, wherein the at least one transverse control arm is a lower transverse control arm.

18. Modular axle concept, according to claim 1, wherein the supporting structure is a part of a self-supporting car body provided in a bottom region of the motor vehicle.

19. Modular axle concept, according to claim 18, wherein the coupling module is configured with at least one connection point for connecting the coupling module to the car body.

20. Modular axle concept, according to claim 1, wherein the accommodation sleeve for the connection point of the supporting structure is a projection adapted to an outer contour of the connection point.

21. Modular axle concept, according to claim 20, wherein the accommodation sleeve of the coupling module and the projection, connecting piece, or stump, which forms the connection point of the supporting structure, are oriented predominantly horizontally relative to the road.

22. Modular axle concept, according to claim 1, wherein the supporting structure is a part of a skeleton car body provided in a bottom region of the motor vehicle.

23. Modular axle concept, according to claim 1, wherein one or more than one battery holder is connected with the supporting structure and positioned in the supporting structure in such a manner that the rigidity of the and/or between the integration points or the connection points for attachment of a coupling module, in each instance, is increased.

24. Modular axle concept, according to claim 1, wherein one or more than one battery holder is disposed between two frame parts of the supporting structure that extend in the longitudinal vehicle direction, in such a manner that rigidity of the integration points or the connection points for attachment of a coupling module, in each instance, is increased.

25. Modular axle concept, according to claim 1, wherein the coupling module is produced by squeeze casting, counter-pressure ingot mold casting (CPC), or die-casting.

26. Modular axle concept, according to claim 1, wherein the coupling module can be connected with the supporting structure as a pre-assembled unit.

27. Modular axle concept, according to claim 1, wherein the connection point is configured in the manner of a stump or connecting piece, in such a manner that a correspondingly predetermined region of the coupling module can be applied to and connected with the stump or the connecting piece.

28. Modular axle concept, according to claim 1, wherein the integration point is an empty space within the supporting structure, in such a manner that at least one accordingly predetermined region of the coupling module can be inserted into the space and can be connected with adjacent regions of the supporting structure.

29. Modular axle concept, according to claim 1, wherein the connection point is configured as an accommodation, in such a manner that at least one correspondingly predetermined region of the coupling module can be inserted into the accommodation and connected with the accommodation.

30. Modular axle concept, according to claim 1, wherein the coupling module is configured with at least one connection point for a longitudinal control arm.

31. Modular axle concept, according to claim 1, wherein the coupling module is configured with at least one connection point for a tie rod.

32. Modular axle concept, according to claim 1, wherein the coupling module is configured with at least one connection point for a spring unit or shock absorber unit.

33. Modular axle concept, according to claim 1, wherein the supporting structure is configured in one piece or multiple pieces with the coupling module, in each instance.

34. Modular axle concept, according to claim 1, wherein the coupling module is releasably or non-releasably connected with the connection point of the supporting structure.

* * * * *